A. McDONALD.
Duplex Toilet Implement.
No. 228,660.                Patented June 8, 1880.
Fig. 1.
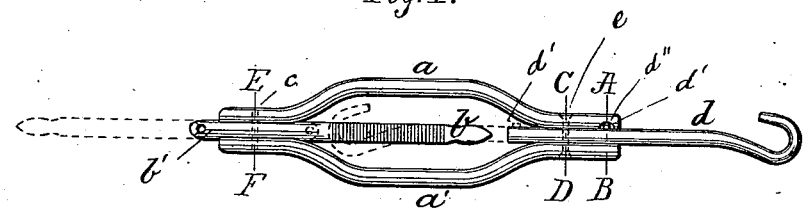
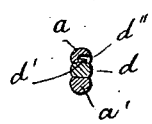
Fig. 2.
Fig. 3.
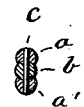
Fig. 4.
Witnesses:
Henry Chadbourn
F. Allen
Inventor
Alexander McDonald
by Alban Andrew
his atty.

UNITED STATES PATENT OFFICE.

ALEXANDER McDONALD, OF WORCESTER, MASSACHUSETTS.

DUPLEX TOILET IMPLEMENT.

SPECIFICATION forming part of Letters Patent No. 228,660, dated June 8, 1880.

Application filed January 14, 1880.

*To all whom it may concern:*

Be it known that I, ALEXANDER MCDONALD, of Worcester, in the county of Worcester and State of Massachusetts, have invented certain new and useful Improvements in Duplex Pocket Implements, of which the following is a specification.

This invention relates to improvements on the patent for finger-nail cutters granted to Richard W. Stewart on the 22d day of May, 1877, No. 190,989; and it consists of a spring-handle made in two separate parts that are held rigidly together at one end and capable of a lateral expansion at the opposite end, by which arrangement I am enabled to secure a folding tool in each end of the handle—as, for instance, a finger-nail cutter and cleaner in one end, similar to the one shown in Stewart's patent above referred to, and a button-hook, corkscrew, or other suitable pocket-tool in the other end. Thus by making the handle in two separate parts, instead of in one solid piece, as shown in said Stewart's patent, I am enabled to increase the usefulness of the tool without much additional expense. In the rigid end of the handle I make a recess or notch on the inside of one of its parts, which, in combination with a suitable projection on the shank of the tool attached in that end, serves as a stop to hold the said tool in its proper working position when folded outward for use. Such stop device is, however, not needed in the expansive end of the duplex handle, as in that end the inner sides of the handle parts are made concave, so as to fit closely against two opposite sides of the convex shank of the tool, precisely as is shown in the Stewart patent above referred to.

On the accompanying drawings, Figure 1 represents a side elevation of my improved tool, showing in full lines the nail-cleaner as folded inward and the button-hook as folded outward, and in dotted lines the reverse position of said tools. Fig. 2 represents a cross-section on the line A B, shown in Fig. 1. Fig. 3 represents a cross-section on the line C D; and Fig. 4 represents a cross-section on the line E F, also shown in Fig. 1.

$a$ $a'$ represent the two separate spring parts of which the handle is composed. $b$ is the nail file and cleaner tool, having in its outer end a nail-cutter, $b'$, as usual. $c$ is the hinge-pin in the expansive end of the handle, which pin is driven tight through the tool $b$, and is freely movable in corresponding holes made in the handle parts, as and for the purpose set forth. $d$ is the button-hook or equivalent or suitable tool, that is jointed to the rigid end of the handles $a$ $a'$ by means of the rivet $e$, that passes through the handle parts and the shank of the tool $d$, after which it is riveted in both of its ends, so as to prevent the handles from expanding, as and for the purpose described. $d'$ represents the projection on the shank of the tool $d$, and $d''$ represents the notch or recess in the rigid end of the handle part $a$, as and for the purpose described.

What I wish to secure by Letters Patent, and claim, is—

The duplex pocket implement composed of the two-part handle formed of the springs $a$ and $a'$, connected rigidly by the rivet $e$, the button-hook or similar tool pivoted on said rivet between the rigidly-connected ends of the springs, and the nail cutter and cleaner pivoted between the expansible ends of the springs at the opposite end of the handle, substantially as described.

ALEXANDER McDONALD.

Witnesses:
ALBAN ANDRÉN,
HENRY CHADBOURN.